(12) United States Patent
Poornachandran et al.

(10) Patent No.: US 10,108,387 B2
(45) Date of Patent: Oct. 23, 2018

(54) TECHNOLOGIES FOR DISPLAY CALIBRATION AND ADJUSTMENT

(71) Applicant: Intel Corporation, Santa Clara, CA (US)

(72) Inventors: Rajesh Poornachandran, Portland, OR (US); Rita H. Wouhaybi, Portland, OR (US); Michael D. Rosenzweig, Hopkinton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/856,041

(22) Filed: Sep. 16, 2015

(65) Prior Publication Data

US 2017/0075638 A1    Mar. 16, 2017

(51) Int. Cl.
*G09G 5/00* (2006.01)
*G06F 3/14* (2006.01)
*H04N 5/232* (2006.01)

(52) U.S. Cl.
CPC ....... *G06F 3/1423* (2013.01); *H04N 5/23229* (2013.01)

(58) Field of Classification Search
CPC .............................. G06F 3/1423; G06F 3/1426
USPC .......................................... 345/1.1, 2.3, 589
See application file for complete search history.

(56) References Cited

U.S. PATENT DOCUMENTS

| | | | | |
|---|---|---|---|---|
| 9,626,145 | B1 * | 4/2017 | Fu | G09G 3/20 |
| 2007/0201492 | A1 * | 8/2007 | Kobayashi | G06F 3/14 |
| | | | | 370/395.64 |
| 2008/0055189 | A1 * | 3/2008 | Wilk | G06F 3/1431 |
| | | | | 345/1.3 |
| 2012/0092234 | A1 * | 4/2012 | Trooskin-Zoller | G06F 3/1446 |
| | | | | 345/1.3 |
| 2014/0292616 | A1 * | 10/2014 | Fear | G06F 3/1423 |
| | | | | 345/1.1 |

OTHER PUBLICATIONS

"Extended Display Identification Data," available at https://en.wikipedia.org/wiki/Extended_display_identification_data, printed Sep. 16, 2015.
"Computer stereo vision," available at https://en.wikipedia.org/wiki/Computer_stereo_vision, printed Sep. 16, 2015.
"Intel RealSense Technology," available at http://www.intel.com/content/www/us/en/architecture-and-technology/realsense-overview.html, printed Jul. 14, 2015.

* cited by examiner

*Primary Examiner* — Calvin C Ma
(74) *Attorney, Agent, or Firm* — Barnes & Thornburg, LLP

(57) ABSTRACT

Technologies for display calibration include a mobile computing device to pair the mobile computing device with another computing device communicatively coupled to a plurality of displays. The mobile computing device captures, by a camera of the mobile computing device, a setup image of the plurality of displays. Additionally, the mobile computing device determines a physical relationship among the displays captured in the setup image, a context of the mobile computing device, and a configuration for each display of the plurality of displays based on the determined physical relationship among the displays captured in the setup image and the determined context of the mobile computing device.

25 Claims, 7 Drawing Sheets

US 10,108,387 B2

TECHNOLOGIES FOR DISPLAY CALIBRATION AND ADJUSTMENT

BACKGROUND

The personal and commercial computing landscape is constantly evolving. In today's systems, users inside and outside of the office are using computing systems that include multiple monitors intended to work together to serve as a single, larger display. Many operating systems utilize techniques for manually aligning the monitors with one another for seamless and fluid display of images and movement of cursors between the monitors. For example, a user may drag thumbnails of representations of the monitors in a graphical user interface relative to each other until the thumbnails represent the actual physical relationship of the monitors to one another. Such techniques are generally cumbersome and require a significant amount of trial and error by the user.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
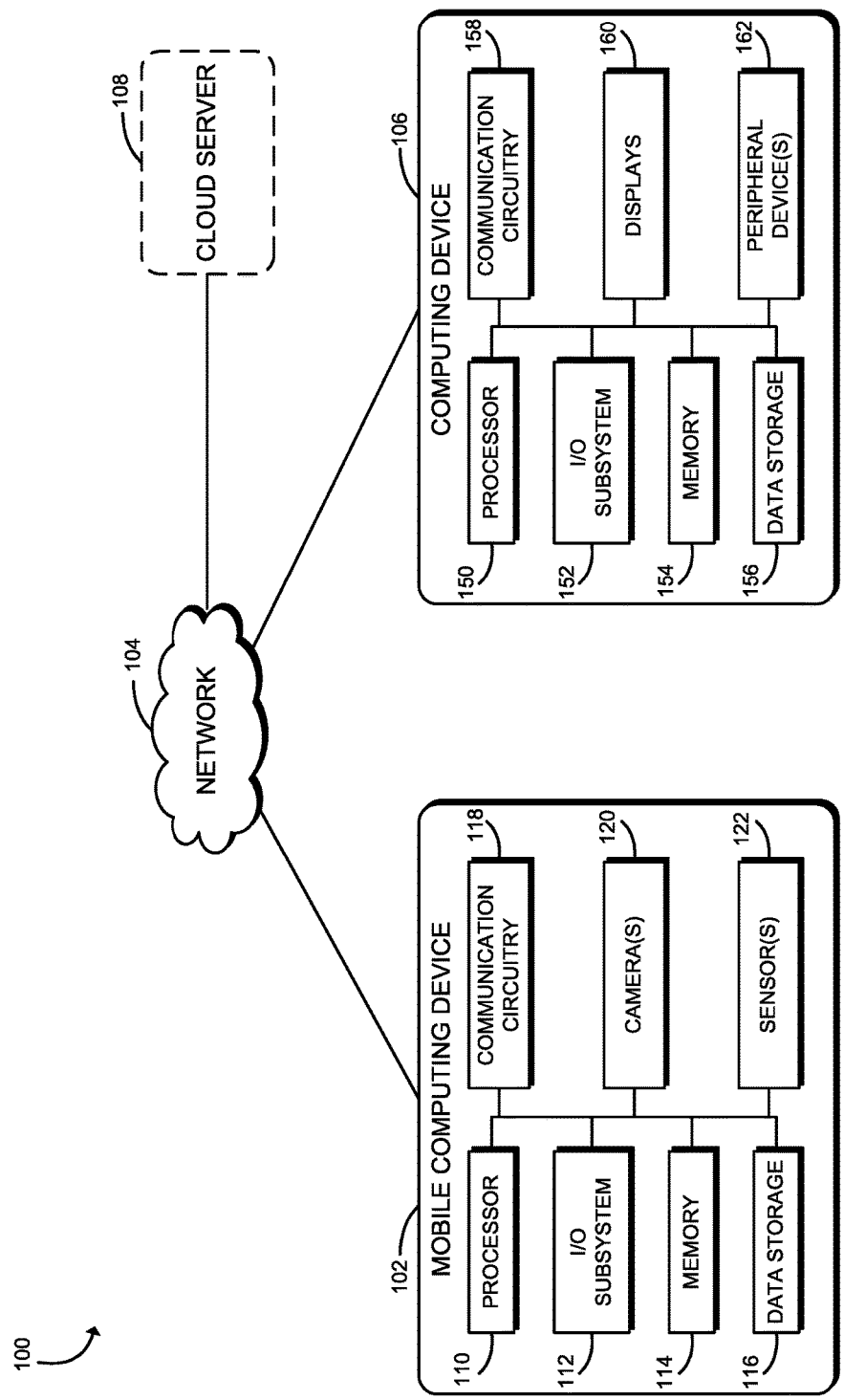
FIG. 1 is a simplified block diagram of at least one embodiment of a system for display calibration and adjustment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for display calibration and adjustment includes a mobile computing device 102, a network 104, and a computing device 106. Additionally, in some embodiments, the system 100 may include a cloud server 108. Although only one mobile computing device 102, one network 104, one computing device 106, and one cloud server 108 are illustratively shown in FIG. 1, the system 100 may include any number of mobile computing devices 102, networks 104, computing devices 106, and/or cloud servers 108 in other embodiments.

Figure 8:
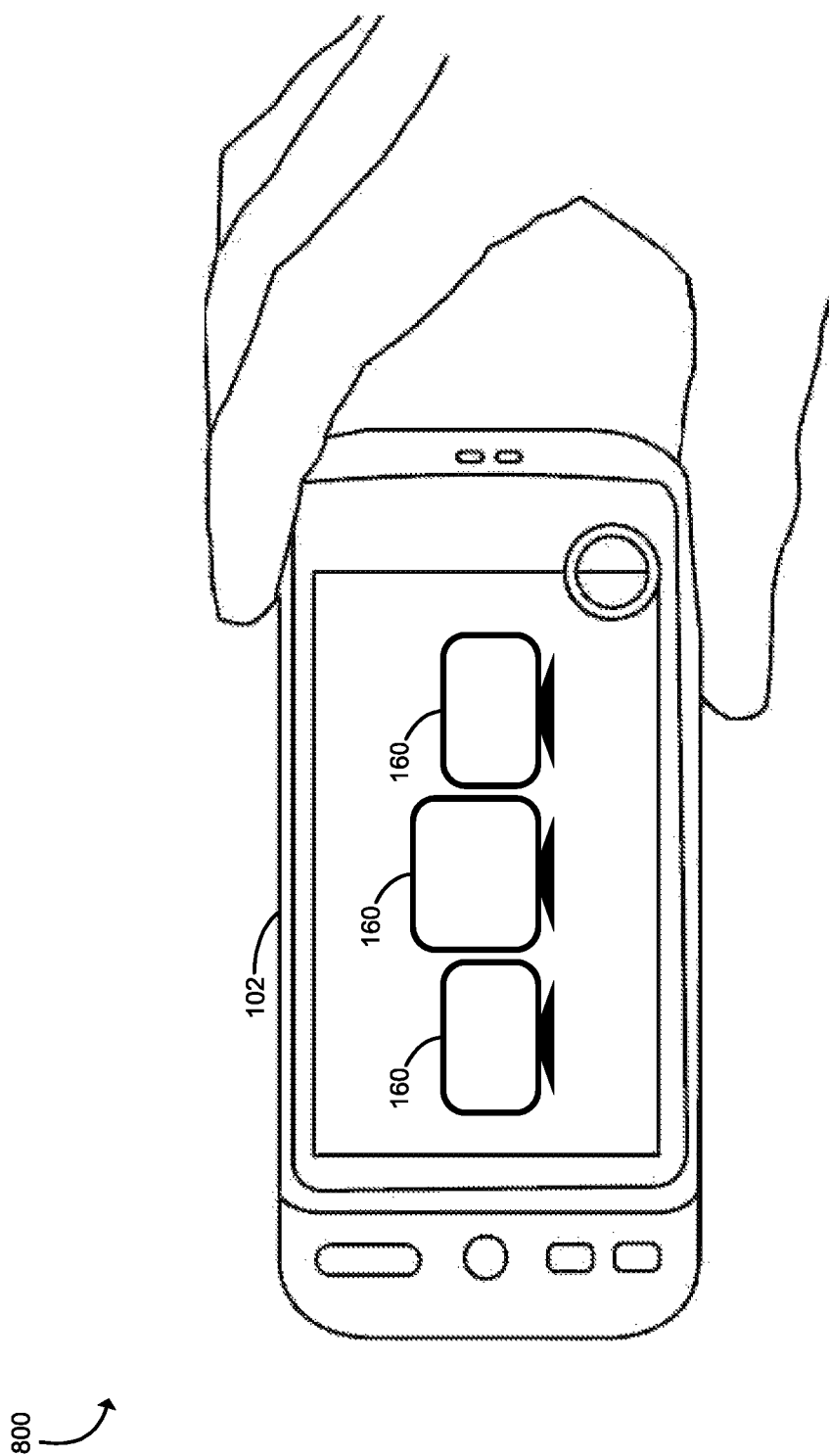
FIG. 8 is a simplified diagram of a user capturing an image of a display setup for display calibration with the mobile computing device of FIG. 2.

As described in detail below, in the illustrative embodiment, the mobile computing device 102 is configured to capture an image of a display setup of the computing device 106 (e.g., a setup desired to be used by the user of the mobile computing device 102) as shown in FIG. 8. The mobile computing device 102 analyzes the captured image to determine a physical relationship of the displays 160 relative to one another (e.g., geometric and/or spatial relationships) and determines a context of the mobile computing device 102 and/or the user of the mobile computing device 102. Based on the physical relationship and/or the context, the mobile computing device 102 determines a configuration for each of the displays 160 that, for example, ensures seamlessness and fluidity of images and movements at transitions between the displays 160. The configuration data may be stored (e.g., locally or in the cloud server 108) so that it may be subsequently retrieved by the mobile computing device 102 (e.g., based on context data) to automatically adjust the displays 160 of the computing device 106.

The mobile computing device 102 may be embodied as any type of computing device capable of performing the functions described herein. For example, the mobile computing device 102 may be embodied as a smartphone, cellular phone, wearable computing device, personal digital assistant, mobile Internet device, tablet computer, netbook, notebook, Ultrabook™, laptop computer, and/or any other mobile computing/communication device. As shown in FIG. 1, the illustrative mobile computing device 102 includes a processor 110, an input/output ("I/O") subsystem 112, a memory 114, a data storage 116, a communication circuitry 118, one or more cameras 120, and one or more sensors 122. Of course, the mobile computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the mobile computing device 102 as described herein.

The communication circuitry 118 may be embodied as any communication circuit, device, or collection thereof, capable of enabling communications between the mobile computing device 102 and other remote devices (e.g., the computing device 106 and/or the cloud server 108) over a network (e.g., the network 104). The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The one or more cameras 120 are configured to capture images or video (i.e., collections of images or frames) and capable of performing the functions described herein. It should be appreciated that each of the cameras 120 may be embodied as any peripheral or integrated device suitable for capturing images, such as a still camera, a video camera, or other device capable of capturing video and/or images. As indicated below, in the illustrative embodiment, each of the cameras 120 may be embodied as a three-dimensional (3D) camera or be otherwise configured to generate 3D/depth images. Such 3D cameras include, for example, depth cameras, bifocal cameras, stereo cameras and/or cameras otherwise capable of generating a depth image, channel, or stream. For example, one or more cameras may include an infrared (IR) projector and an IR sensor such that the IR sensor estimates depth values of objects in the scene by analyzing the IR light pattern projected on the scene by the IR projector. In another embodiment, one or more of the cameras 120 include at least two lenses and corresponding sensors configured to capture images from at least two different viewpoints of a scene (e.g., a stereo camera). In some embodiments, one or more of the camera(s) 120 may be embodied as an Intel® RealSense™ 3D camera.

The sensors 122 may be embodied as any sensors configured to generate data/signals indicative of an environment or context of the mobile computing device 102 and/or user of the mobile computing device 102. In various embodiments, the sensors 122 may be embodied as, or otherwise include, for example, inertial sensors, position sensors, location sensors, proximity sensors, optical sensors, light sensors, audio sensors, temperature sensors, motion sensors, piezoelectric sensors, cameras, and/or other types of sensors. Of course, the mobile computing device 102 may also include components and/or devices configured to facilitate the use of the sensor(s) 122. Depending on the particular embodiment, the sensors 122 may include hardware sensors and/or software sensors (e.g., software sensors to identify software applications executed at a particular point in time).

The network 104 may be embodied as any type of communication network capable of facilitating communication between the mobile computing device 102 and remote devices (e.g., the computing device 106 and/or the cloud server 108. As such, the network 104 may include one or more networks, routers, switches, computers, and/or other intervening devices. For example, each network 104 may be embodied as or otherwise include one or more cellular networks, telephone networks, local or wide area networks, publicly available global networks (e.g., the Internet), an ad hoc network, or any combination thereof.

The computing device 106 may be embodied as any type of computing device capable of performing the functions described herein. For example, in some embodiments, the computing device 106 may be embodied as a desktop computer, workstation, smart TV/monitor, projector, server, laptop computer, tablet computer, notebook, netbook, Ultrabook™, and/or any other computing/communication device. As shown in FIG. 1, the illustrative computing device 106 includes a processor 150, an I/O subsystem 152, a memory 154, a data storage 156, a communication circuitry 158, a plurality of displays 160, and one or more peripheral devices 162. Each of the processor 150, the I/O subsystem 152, the memory 154, the data storage 156, and the communication circuitry 158 may be similar to the corresponding components of the mobile computing device 102. As such, the description of those components of the mobile computing device 102 is equally applicable to the described of those components of the computing device 106 and is not repeated herein for clarity of the description.

Each of the displays 160 of the computing device 106 may be embodied as any type of display on which information may be displayed to a viewer of the computing device 106. Further, each of the displays 160 may be embodied as, or otherwise use any suitable display technology including, for example, a liquid crystal display (LCD), a light emitting diode (LED) display, a cathode ray tube (CRT) display, a plasma display, an image projector (e.g., 2D or 3D), a laser projector, a touchscreen display, and/or other display technology. As described herein, an image or video may be displayed across several displays 160 in a display setup to generate a larger display format.

The peripheral devices 162 may include any number of additional peripheral or interface devices, such as speakers, microphones, additional storage devices, and so forth. The particular devices included in the peripheral devices 162 may depend on, for example, the type and/or intended use of the computing device 106.

The cloud server 108 may be embodied as any type of computing device capable of performing the functions described herein. For example, in some embodiments, the cloud server 108 may be embodied as a server, rack-mounted server, blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. Further, the cloud server 108 may include components similar to those of the mobile computing device 102 and/or the computing device 106 discussed above. The description of those components of the computing devices 102, 106 is equally applicable to the description of components of the cloud server 108 and is not repeated herein for clarity of the description. Further, it should be appreciated that the cloud server 108 may include other components, sub-components, and devices commonly found in a computing device, which are not discussed above in reference to the computing devices 102, 106 and not discussed herein for clarity of the description. In some embodiments, one or more of the components of the computing devices 102, 106 may be omitted from the cloud server 108.

Figure 2:
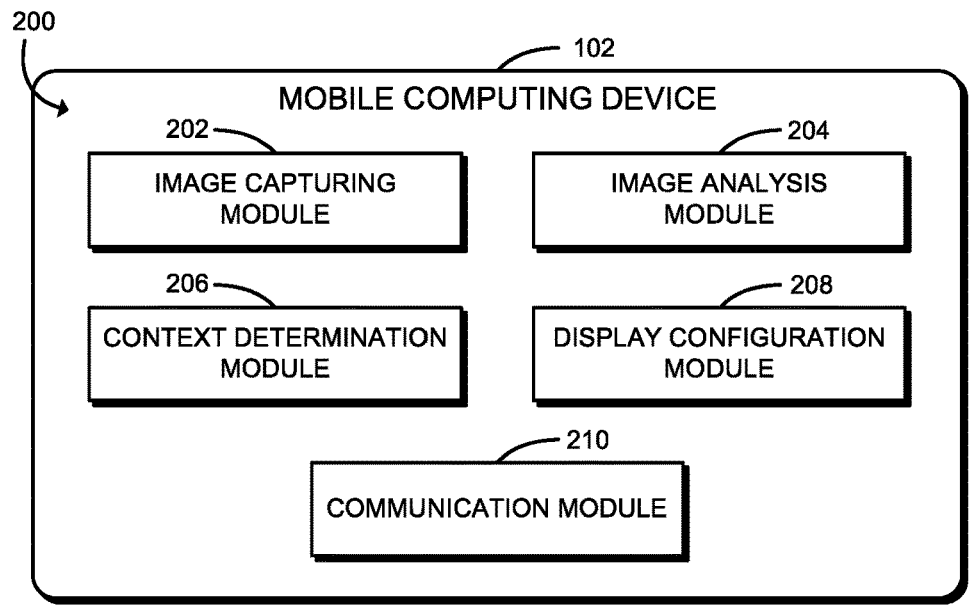
FIG. 2 is a simplified block diagram of at least one embodiment of an environment of a mobile computing device of the system of FIG. 1.

Referring now to FIG. 2, in use, the mobile computing device 102 establishes an environment 200 for display calibration and adjustment. The illustrative environment 200 includes an image capturing module 202, an image analysis module 204, a context determination module 206, a display configuration module 208, and a communication module 210. The various modules of the environment 200 may be embodied as hardware, software, firmware, or a combination thereof. For example, the various modules, logic, and other components of the environment 200 may form a portion of, or otherwise be established by, the processor 110 or other hardware components of the mobile computing device 102. As such, in some embodiments, one or more of the modules of the environment 200 may be embodied as circuitry or collection of electrical devices (e.g., an image capturing circuitry 202, an image analysis circuitry 204, a context determination circuitry 206, a display configuration circuitry 208, and/or a communication circuitry 210). Additionally, in some embodiments, one or more of the illustrative modules may form a portion of another module and/or one or more of the illustrative modules may be independent of one another.

The image capturing module 202 controls the camera 120 to capture images within the field of view of the camera 120. As described herein, the user may capture an image of a display setup including a plurality of displays 120 to be used to display a larger image. For example, a user of the mobile computing device 102 may desire to use two desktop monitors within one another such that they operate as a single larger monitor.

The image analysis module 204 receives the captured images from the camera 120 and analyzes the images to determine a physical relationship among the displays 160 in the captured images. In some embodiments, the image analysis module 204 may identify objects in the scene (e.g., in the foreground) of the captured image and may utilize any suitable object detection algorithm for doing so. For example, the image analysis module 204 may utilize image gradient operator(s) (e.g., separable Sobel filters), a Canny edge detector, and/or other edge detection algorithms. In another embodiment, the image analysis module 204 may additionally, or alternatively, utilize one or more suitable image segmentation algorithms for identifying the objects in the scene (e.g., pyramid segmentation). In some embodiments, the image analysis module 204 may further utilize one or more object classification algorithms or techniques to identify the displays 160 in the captured image. In other embodiments, the user of the mobile computing device 102 may select (e.g., via a graphical user interface) the displays 160 in the captured image. In determining the physical relationship among the displays 160, the image analysis module 204 may determine the real-world geometric and/or spatial relationship of each display 160 relative to each other display 160 (e.g., distances, angles, etc.) based on the captured image. It should be appreciated that the image analysis module 204 may determine the physical relationship among the displays 160 using any suitable algorithms and/or techniques. Further, depending on the particular embodiment, the image analysis module 204 may perform the analyses described herein in two dimensions and/or three dimensions (e.g., using the depth channel information).

The context determination module 206 may determine the context of the mobile computing device 102 and/or the user of the mobile computing device 102 based on, for example, sensor data generated by the sensors 122 (e.g., hardware and/or software sensors) and/or other suitable data of the mobile computing device 102. For example, in some embodiments, the context determination module 206 may determine a current user of the mobile computing device 102, a location of the mobile computing device 102, applications executed (e.g., currently executing) on the mobile computing device 102 or other application data, remote computing devices in the vicinity of the mobile computing device 102, computing devices to which the mobile computing device 102 is paired, the current time, device capabilities, characteristics of the mobile computing device 102, input devices, and/or other suitable contextual information.

The display configuration module 208 is configured to determine a configuration for each display 160 of the display setup in the captured image based on the physical relationship among the displays 160 and the context of the mobile computing device 102. In doing so, the display configuration module 208 determines a proper alignment/orientation of each of the displays 160 (e.g., to ensure seamless and fluid display of images and movement across/between displays 160 physically adjacent one another. For example, in some embodiments, two displays 160 may have different sizes and be adjacent one another in the display setup. The display configuration module 208 may determine an alignment for each of those displays 160 to ensure, for example, that movement of a cursor between the displays 160 is "smooth"

and does not involve a "jump." The display configuration module 208 may also determine a proper resolution for each of the displays 160.

Further, in some embodiments, the display configuration module 208 may identify each of the displays 160 captured in the display setup image. It should be appreciated that each of the displays 160 may have a unique identification such as, for example, an Extended Display Identification Data (EDID) identifier or other suitable identifier. In some embodiments, the computing device 106 may render an identifier or identifying feature on each of the displays 160 that may be identified by the display configuration module 208 and utilized to uniquely identify each of the displays 160 in the captured image. For example, the computing device 106 may display a letter, shape, EDID identifier, and/or other suitable image. In some embodiments, the mobile computing device 102 and the computing device 106 may wirelessly communicate with one another to exchange information associated with identifying the displays 160. Further, in some embodiments, users may place "marker stickers" on the displays 160 (e.g., for improved accuracy and/or in circumstances in which the display identifiers cannot be accessed from the cloud server 108).

As described herein, the display configuration data may be stored by the display configuration module 208 for subsequent retrieval by the mobile computing device 102 (e.g., to automatically reload the proper configuration data in response to determining the user is located at a workstation for which the configuration data is stored). In some embodiments, the configuration data may be hashed using an appropriate hash algorithm and/or may be stored to the cloud server 108 or other remote storage. It should be appreciated that the display configuration module 208 may adjust the displays 160 based on the configuration data. To do so, in some embodiments, the mobile computing device 102 may transmit instructions to the computing device 106 to adjust the displays 160 accordingly.

The communication module 210 handles the communication between the mobile computing device 102 and other computing devices of the system 100 (e.g., the computing device 106 and/or the cloud server 108). For example, as described herein, the mobile computing device 102 may transmit the display configuration data to the cloud server 108 and/or instructions to the computing device 106 to adjust the displays 160. Additionally, the communication module 210 is configured to pair the mobile computing device 102 with the computing device 106 and/or other remote computing devices as described herein.

Figure 3:
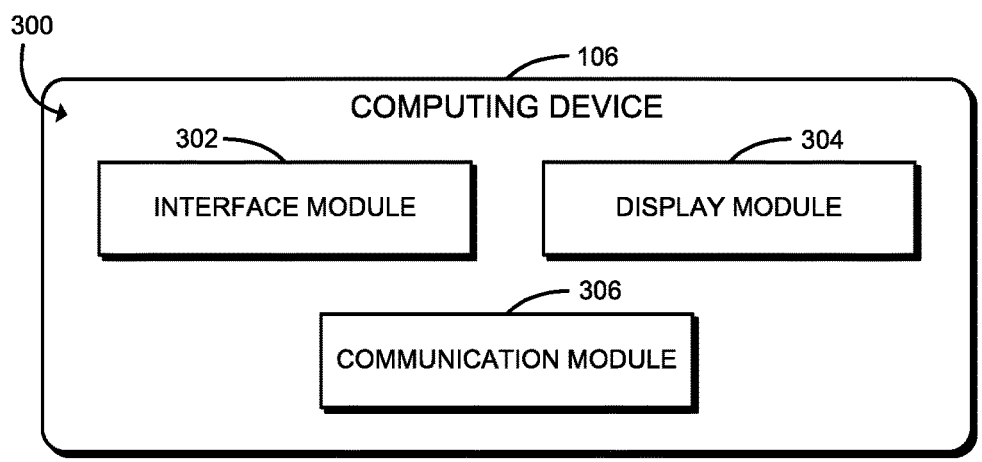
FIG. 3 is a simplified block diagram of at least one embodiment of an environment of a computing device of the system of FIG. 1.

Referring now to FIG. 3, in use, the computing device 106 establishes an environment 300 for display calibration and adjustment. The illustrative environment 300 includes an interface module 302, a display module 304, and a communication module 306. The various modules of the environment 300 may be embodied as hardware, software, firmware, or a combination thereof. For example, the various modules, logic, and other components of the environment 300 may form a portion of, or otherwise be established by, the processor 150 or other hardware components of the computing device 106. As such, in some embodiments, one or more of the modules of the environment 300 may be embodied as circuitry or collection of electrical devices (e.g., an interface circuitry 302, a display circuitry 304, and/or a communication circuitry 306). Additionally, in some embodiments, one or more of the illustrative modules may form a portion of another module and/or one or more of the illustrative modules may be independent of one another.

The interface module 302 is configured to permit the user to interact with and/or provide feedback to the computing device 106. For example, in some embodiments, the user may provide feedback to the operating system of the computing device 106 or an application regarding the acceptability of a display configuration determined by the mobile computing device 102 as described herein.

The display module 304 is configured to render images on the displays 160 of the computing device 106. As discussed above, the display module 304 may be configured to display a larger image across the displays 160 such that a separate portion of the image is displayed on each of the displays 160 and the portions combine to be the larger image. Further, the images are displayed in the proper orientation, alignment, and/or resolution based on the display configuration data.

The communication module 306 handles the communication between the computing device 106 and other computing devices of the system 100 (e.g., the mobile computing device 102 and/or the cloud server 108). For example, as described herein, the computing device 106 may receive display configuration data from the mobile computing device 102 and/or the cloud server 108 in order to adjust the displays 160 for proper image alignment. Additionally, the communication module 306 may communicate with the mobile computing device 102 to pair the computing devices 102, 106 to one another as described herein.

Figure 4:
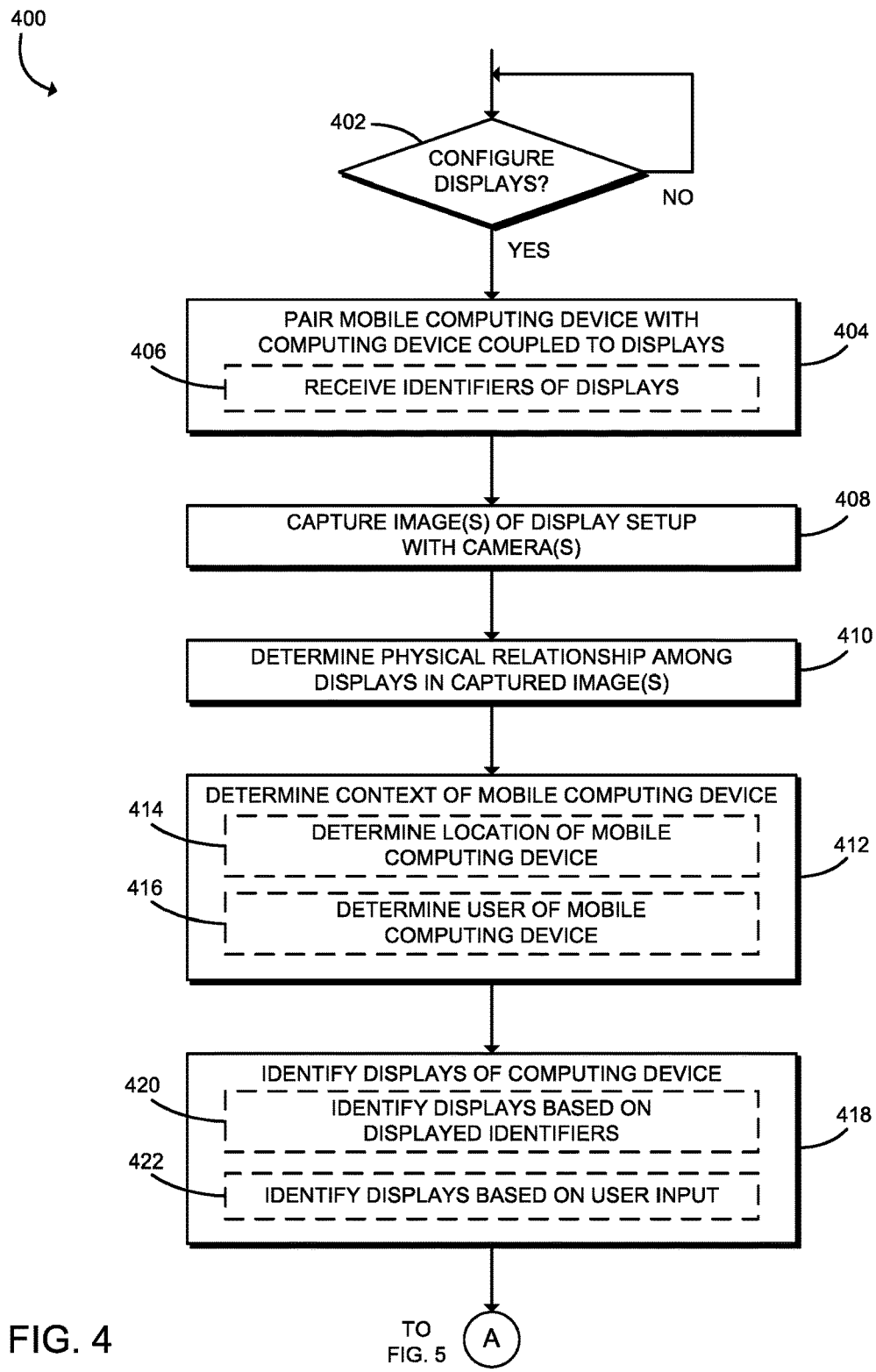
FIGS. 4-5 is a simplified flow diagram of at least one embodiment of a method for display configuration that may be executed by the mobile computing device of FIG. 2.

Referring now to FIG. 4, in use, the mobile computing device 102 may execute a method 400 for display calibration. The illustrative method 400 begins with block 402 in which the mobile computing device 102 determines whether to configure displays 160 in a display setup of the computing device 106. If so, the mobile computing device 102 is paired with the computing device 106 coupled to the displays 160. For example, the mobile computing device 102 may be paired with the computing device 106 via near field communication (NFC), Bluetooth® communication, Wi-Fi® communication, or another short-range communication. In block 406, the mobile computing device 102 may receive identifiers of the displays 160 from the computing device 106. For example, in some embodiments, the mobile computing device 102 may receive an EDID identifier of each of the displays 160.

In block 408, the mobile computing device 102 captures one or more images of the display setup including the displays 160 with the camera 120. For example, as shown in the diagram 800 of FIG. 8, the user may use the mobile computing device 102 to capture an image of a display setup of three displays 160 aligned side-by-side. In block 410, the mobile computing device 102 determines the physical relationship among the displays 160 in the captured display setup. As discussed above, the mobile computing device 102 may determine the real-world three dimensional position of each of the displays 160 relative to one another based on the captured image. The mobile computing device 102 may utilize any suitable algorithms and/or techniques to do so.

In block 412, the mobile computing device 102 determines the context of the mobile computing device 102 and/or a user of the mobile computing device 102. In particular, in block 414, the mobile computing device 102 may determine a location of the mobile computing device 102. For example, as described herein, the mobile computing device 102 may utilize geo-fencing to associate a particular display setup with a particular physical location. In block 416, the mobile computing device 102 may determine a current user of the mobile computing device 102. Of course, the mobile computing device 102 may determine other suitable contextual information (e.g., based on data generated by the sensors 122) depending on the particular embodiment. For example, in some embodiments, the mobile computing device 102 may determine a current user of the mobile computing device 102, a location of the mobile computing device 102, applications executed (e.g., currently executing) on the mobile computing device 102 or other application data, remote computing devices in the vicinity of the mobile computing device 102, computing devices to which the mobile computing device 102 is paired, the current time, device capabilities, characteristics of the mobile computing device 102, input devices, and/or other suitable contextual information.

In block 418, the mobile computing device 102 identifies the displays 160 coupled to the computing device 106. In doing so, in block 420, the mobile computing device 102 may identify the displays 160 based on unique identifiers rendered on the displays 160. For example, the computing device 106 may display a letter, shape, EDID identifier, and/or other suitable image that may be identified by the mobile computing device 102 in the captured image. In such embodiments, the mobile computing device 102 may correlate the identifiers received from the computing device 106 with the displayed identifiers to uniquely identify the displays 160. In block 422, the mobile computing device 102 may identify the displays 160 based on user input. For example, a user of the mobile computing device 102 may select the particular displays 160 in the captured image.

Figure 5:
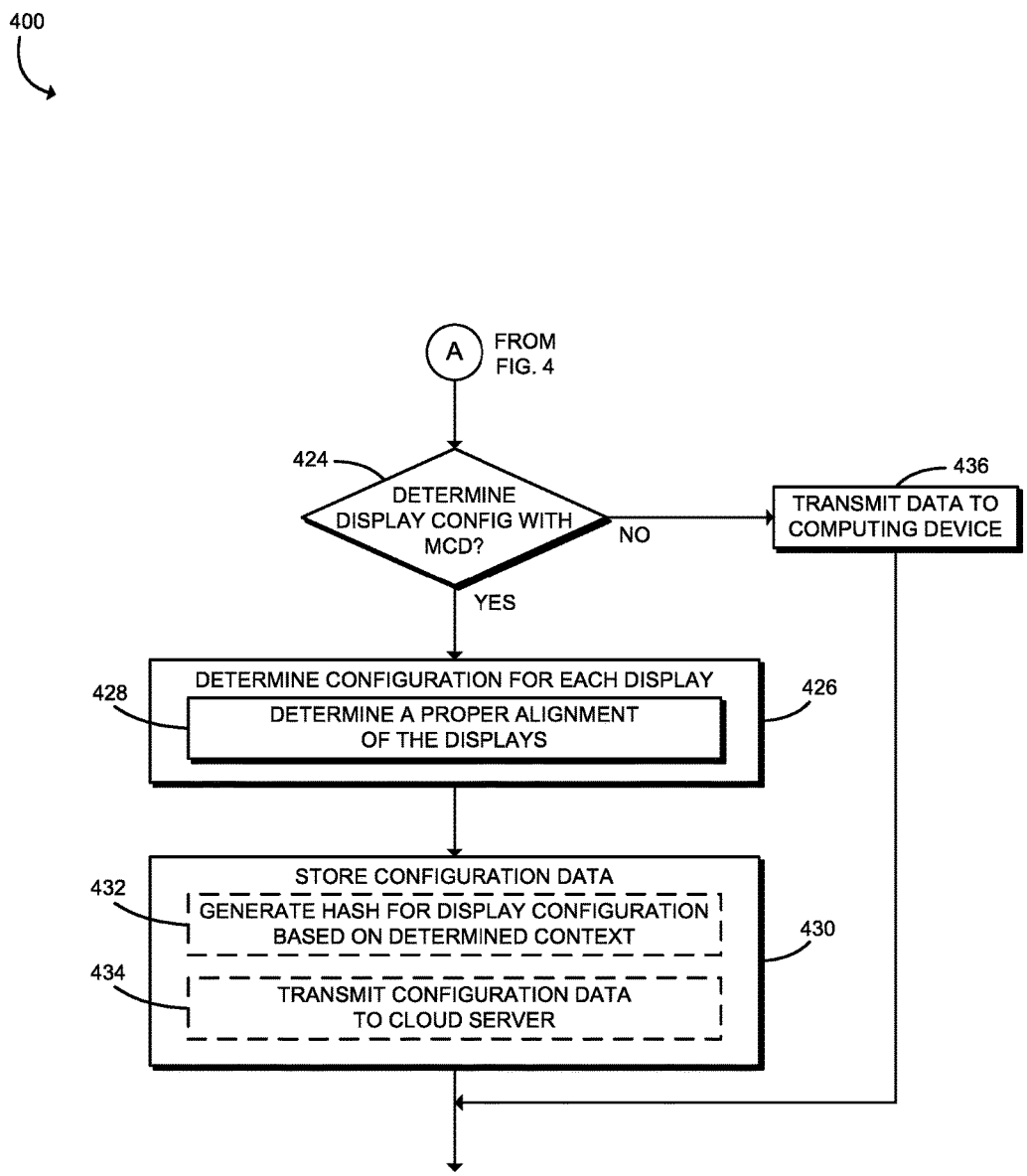

The method 400 advances to block 424 of FIG. 5 in which the mobile computing device 102 determines whether to determine a proper display configuration with the mobile computing device (MCD) 102. If so, in block 426, the mobile computing device 102 determines the proper configuration for each display 160. In particular, in block 428, the mobile computing device 102 determines a proper alignment of the displays 160. For example, the mobile computing device 102 may determine the required configuration of the displays 160 in order for the images to be properly displayed on the displays 160 when the displays 160 are physically positioned relative to one another in the same manner as that reflected in the captured image. It should be appreciated that, by doing so, the mobile computing device 102 may calibrate the displays 160 for automatic seamless and fluid display of images by subsequently loading the proper configuration data for the setup.

In block 430, the mobile computing device 102 stores the configuration data. In some embodiments, in block 432, the mobile computing device 102 may generate a hash for the display configuration based on the determined context, which may be stored. For example, in some embodiments, the hash may be generated based on the user (e.g., determined via user authentication), the location (e.g., determined via nearby Wi-Fi® hotspots, GPS, and/or other location-determining technologies) of the mobile computing device 102, the identities of the displays 160, and/or other suitable parameters. It should be appreciated that, in some embodiments, the mobile computing device 102 may subsequently generate a hash based on the contextual parameters of the mobile computing device 102 to determine the corresponding display configuration as described below (see FIG. 6). It should be appreciated that the particular parameters utilized in the generating the hash may vary depending on the particular embodiment. In some embodiments, the mobile computing device 102 may store the configuration data and/or the generated hash locally to the memory 114 and/or the data storage 116. Additionally or alternatively, in block 434, the mobile computing device 102 may transmit the configuration data and/or the generated hash to the cloud server 108 or other remote computing device for storage (e.g., in circumstances in which the mobile computing device 102 has data storage limitations).

Returning to block 424, if the mobile computing device 102 does not determine the display configuration corresponding with the display setup, the mobile computing device 102 may transmit data to the computing device 106 or the cloud server 108 to do so. For example, the mobile computing device 102 may transmit the captured images, the determined physical relationships among the displays 160 in the captured images, the determined context of the mobile computing device 102 or contextual data/parameters upon which the context may be determined, display identifiers, and/or other suitable data depending on the particular embodiment (e.g., depending on the extent of analysis performed by the computing device 106 or the cloud server 108).

Figure 6:
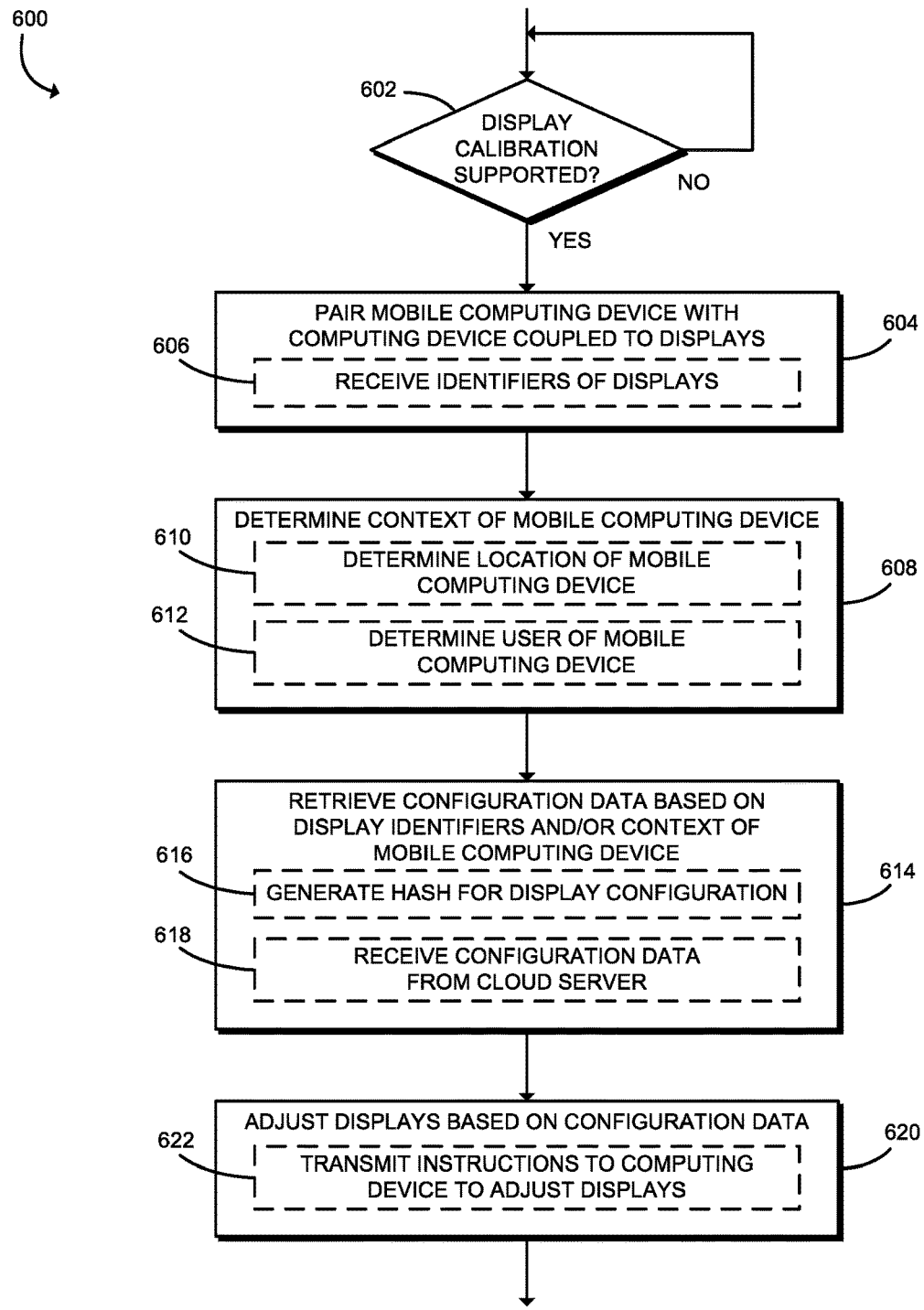
FIG. 6 is a simplified flow diagram of at least one embodiment of a method for adjusting displays that may be executed by the mobile computing device of FIG. 2.

Referring now to FIG. 6, in use, the mobile computing device 102 may execute a method 600 for adjusting the displays 160. The illustrative method 600 begins with block 602 in which the mobile computing device 102 determines whether automatic display calibration or configuration is supported by the system 100. It should be appreciated that the mobile computing device 102 may utilize any suitable techniques for making such a determination. For example, in some embodiments, the mobile computing device 102 may communicate with the computing device 106 to determine whether multiple displays 160 are coupled to the computing device 106 that have configurable parameters (e.g., display resolution, alignment, orientation, etc.).

If the mobile computing device 102 determines that display calibration is supported, the mobile computing device 102 is paired with the computing device 106 coupled to the displays 160. For example, as described above, the mobile computing device 102 may be paired with the computing device 106 via near field communication (NFC), Bluetooth® communication, Wi-Fi® communication, or another short-range communication. Further, in block 606, the mobile computing device 102 may receive identifiers of the displays 160 (e.g., EDID identifiers) from the computing device 106.

In block 608, the mobile computing device 102 determines the context of the mobile computing device 102 and/or a user of the mobile computing device 102. In particular, in block 610, the mobile computing device 102 may determine a location of the mobile computing device 102. For example, the mobile computing device 102 may determine the location of the mobile computing device 102 based on nearby Wi-Fi® hotspots, GPS, and/or other location-determining technologies. Further, in block 612, the mobile computing device 102 may determine a current user of the mobile computing device 102 (e.g., via user authentication).

In block 614, the mobile computing device 102 retrieves the configuration data for the displays 160 based on the display identifiers and/or the context of the mobile computing device 102. In doing so, in block 616, the mobile computing device 102 may generate a hash that is indicative of the proper display configuration. For example, as described above, the mobile computing device 102 may generate a hash indicative of a particular display configuration based on the current user, the location of the mobile computing device 102, and the identities of the displays 160, which may be stored locally or to the cloud server 108. Accordingly it should be appreciated that, by generating a hash based on the current context, user, and/or display identities, the mobile computing device 102 may identify the display configuration data having a matching hash. In block 618, the mobile computing device 102 may retrieve the configuration data from the cloud server 108 (e.g., in embodiments in which the mobile computing device 102 has insufficient storage capacity). It should be appreciated that by correlating the display configuration with contextual information, the mobile computing device 102 may employ techniques such as geo-tagging in which a particular display configuration is associated with a geographical location and/or other contextual information. As such, different display configuration data may be retrieved depending on the context of the mobile computing device 102 and/or the user.

In block 620, the mobile computing device 102 adjusts the displays 160 based on the configuration data. In doing so, in block 622, the mobile computing device 102 may transmit instructions to the computing device 106 to adjusts the displays 160 accordingly based on the configuration data, which is representative of proper alignment of the displays 160. As described above, in the illustrative embodiment, the displays 160 may be adjusted so that there is seamless migration across the displays 160 for both images rendered across the displays 160 and movements (e.g., of a cursor) across the displays 160.

Figure 7:
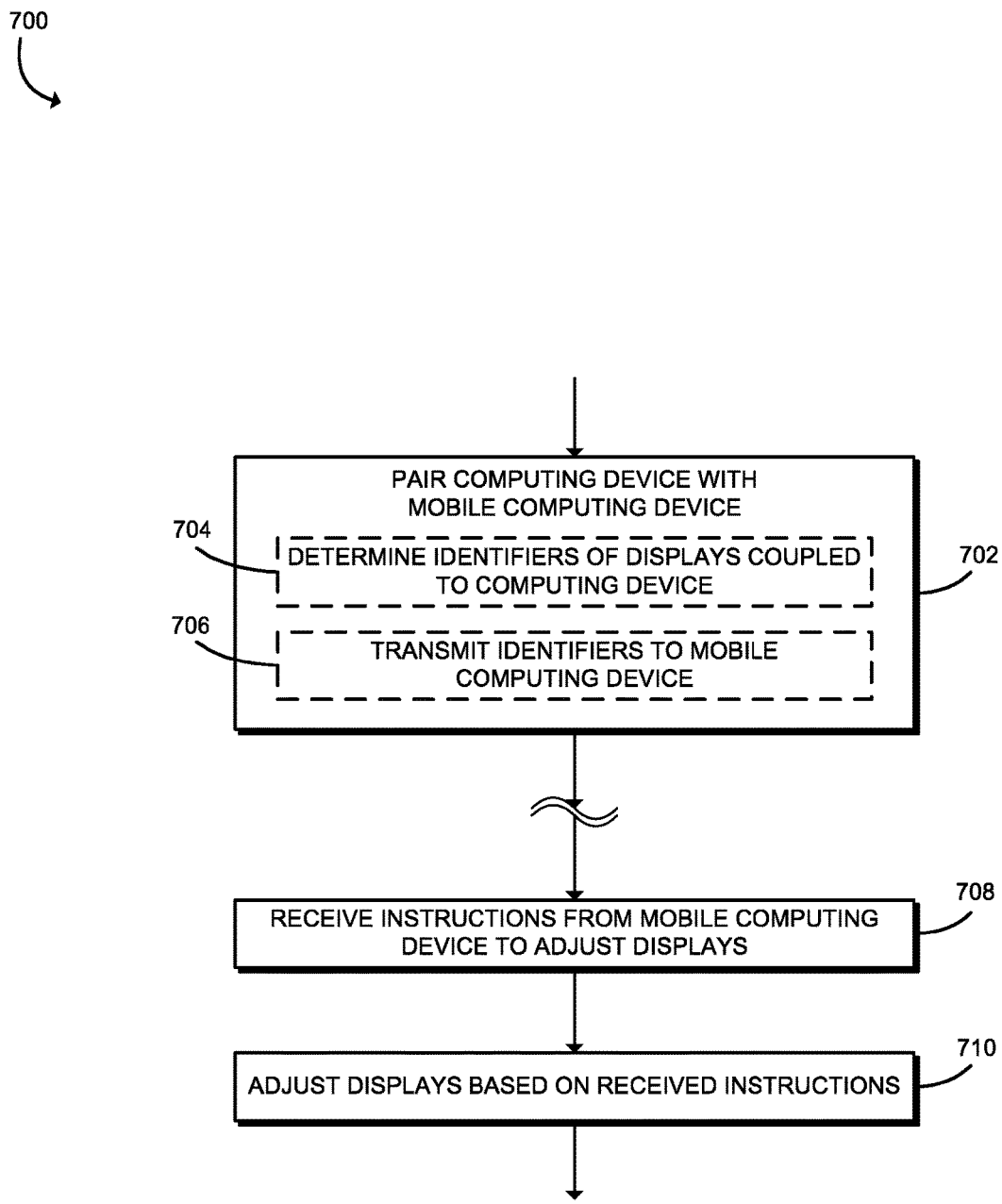
FIG. 7 is a simplified flow diagram of at least one embodiment of a method for adjusting displays that may be executed by the computing device of FIG. 3.

Referring now to FIG. 7, in use, the computing device 106 may execute a method 700 for adjusting the displays 160. The illustrative method 700 begins with block 702 in which the computing device 106 is paired with the mobile computing device 102. In doing so, in block 704, the computing device 106 may determine identifiers of the displays 160 coupled to the computing device 106 and, in block 706, the computing device 106 may transmit the identifiers to the mobile computing device 102. For example, the computing device 106 may determine an EDID identifier for each of the displays 160 and transmit the EDID identifiers to the mobile computing device 102. In block 708, the computing device 106 may receive instructions from the mobile computing device 102 to adjust the displays 160 of the computing device 106 and, in block 710, the computing device 106 may adjust the displays 160 based on the received instructions. Depending on the particular embodiment, the instructions may include the display configuration data and/or other data useful to the computing device 106 in adjusting the displays 160 to be consistent with the desired configuration.

It should be appreciated that the techniques described herein may be used in a wide variety of ways. For example, in one embodiment, the user may set up the displays 160 according to the techniques described herein and temporarily abandon the displays 160 (e.g., to go to work). While away, another user (e.g., the user's child) may physically modify the displays 160. In such embodiments, the user may capture an image of the display setup upon return, and the mobile computing device 102 may determine reverse movements required to physically move the displays 160 back into the positions consistent with a corresponding display configuration. Of course, if the other user simply modifies the display alignment, orientation, and/or resolution (e.g., via the operating system), the mobile computing device 102 may automatically correct the display configuration upon return based on the techniques described herein. It should further be appreciated that, in some embodiments, the system 100 may leverage augmented reality techniques or otherwise generate and provide suggestions to the user regarding various possible display setup configurations. For example, in some embodiments, the system 100 may utilize crowd-sourced display configuration data from many users to provide the user of the mobile computing device 102 with feedback/recommendations regarding the most appropriate or preferred display configurations for the particular display setup (e.g., the most frequently utilized display configuration of the users).

EXAMPLES

Illustrative examples of the technologies disclosed herein are provided below. An embodiment of the technologies may include any one or more, and any combination of, the examples described below.

Example 1 includes a mobile computing device for display calibration, the mobile computing device comprising a camera; a communication circuitry to pair the mobile computing device with another computing device communicatively coupled to a plurality of displays; an imaging capturing circuitry to capture a setup image of a display setup of the plurality of displays with the camera; an image analysis circuitry to determine a physical relationship among the displays captured in the setup image; a context determination circuitry to determine a context of the mobile computing device; and display configuration circuitry to determine a configuration for each display of the plurality of displays based on the determined physical relationship among the displays captured in the setup image and the determined context of the mobile computing device.

Example 2 includes the subject matter of Example 1, and wherein to determine the configuration for each display comprises to determine a proper alignment of each display.

Example 3 includes the subject matter of any of Examples 1 and 2, and wherein the display configuration circuitry is further to identify each display of the plurality of displays captured in the setup image.

Example 4 includes the subject matter of any of Examples 1-3, and wherein to determine the configuration for each display comprises to determine the configuration based on an identification of the corresponding display.

Example 5 includes the subject matter of any of Examples 1-4, and wherein the identification of the corresponding display comprises an Extended Display Identification Data (EDID) identifier.

Example 6 includes the subject matter of any of Examples 1-5, and wherein to identify each display of the plurality of displays comprises to identify each display based on an identifier rendered on the corresponding display and captured in the setup image.

Example 7 includes the subject matter of any of Examples 1-6, and wherein to determine the context of the mobile computing device comprises to determine a location of the mobile computing device.

Example 8 includes the subject matter of any of Examples 1-7, and wherein to determine the context of the mobile computing device comprises to determine a current user of the mobile computing device.

Example 9 includes the subject matter of any of Examples 1-8, and wherein the display configuration circuitry is further to store configuration data indicative of the determined configuration for each display.

Example 10 includes the subject matter of any of Examples 1-9, and wherein storing the configuration data comprises generating a hash associated with the display setup based on the determined context.

Example 11 includes the subject matter of any of Examples 1-10, and wherein to store the configuration data comprises to transmit the configuration data to a cloud server.

Example 12 includes the subject matter of any of Examples 1-11, and wherein the display configuration circuitry is further to adjust the plurality of displays based on the configuration for each display.

Example 13 includes the subject matter of any of Examples 1-12, and wherein to adjust the plurality of displays comprises to transmit instructions to the another computing device to adjust the plurality of displays.

Example 14 includes the subject matter of any of Examples 1-13, and wherein to adjust the plurality of displays comprises to adjust the plurality of displays in response to retrieval of configuration data indicative of the determined configuration for each display from a cloud server.

Example 15 includes the subject matter of any of Examples 1-14, and wherein to determine the configuration for each display comprises to determine a proper orientation and resolution for each display.

Example 16 includes the subject matter of any of Examples 1-15, and wherein the setup image includes a depth channel.

Example 17 includes the subject matter of any of Examples 1-16, and wherein to determine the configuration for each display comprises to determine the configuration based on a setup recommendation received from a cloud server, wherein the setup recommendation is based on display configurations utilized by a plurality of other users.

Example 18 includes a method for display calibration by a mobile computing device, the method comprising pairing the mobile computing device with another computing device communicatively coupled to a plurality of displays; capturing, by a camera of the mobile computing device, a setup image of the plurality of displays; determining, by the mobile computing device, a physical relationship among the displays captured in the setup image; determining, by the mobile computing device, a context of the mobile computing device; and determining, by the mobile computing device, a configuration for each display of the plurality of displays based on the determined physical relationship among the displays captured in the setup image and the determined context of the mobile computing device.

Example 19 includes the subject matter of Example 18, and wherein determining the configuration for each display comprises determining a proper alignment of each display.

Example 20 includes the subject matter of any of Examples 18 and 19, and further including identifying, by the mobile computing device, each display of the plurality of displays captured in the setup image.

Example 21 includes the subject matter of any of Examples 18-20, and wherein determining the configuration for each display comprises determining the configuration based on an identification of the corresponding display.

Example 22 includes the subject matter of any of Examples 18-21, and wherein the identification of the corresponding display comprises an Extended Display Identification Data (EDID) identifier.

Example 23 includes the subject matter of any of Examples 18-22, and wherein identifying each display of the plurality of displays comprises identifying each display based on an identifier rendered on the corresponding display and captured in the setup image.

Example 24 includes the subject matter of any of Examples 18-23, and wherein determining the context of the mobile computing device comprises determining a location of the mobile computing device.

Example 25 includes the subject matter of any of Examples 18-24, and wherein determining the context of the mobile computing device comprises determining a current user of the mobile computing device.

Example 26 includes the subject matter of any of Examples 18-25, and further including storing, by the mobile computing device, configuration data indicative of the determined configuration for each display.

Example 27 includes the subject matter of any of Examples 18-26, and wherein storing the configuration data comprises generating a hash associated with the display setup based on the determined context.

Example 28 includes the subject matter of any of Examples 18-27, and wherein storing the configuration data comprises transmitting the configuration data to a cloud server.

Example 29 includes the subject matter of any of Examples 18-28 and further including adjusting the plurality of displays based on the configuration for each display.

Example 30 includes the subject matter of any of Examples 18-29, and wherein adjusting the plurality of displays comprises transmitting, from the mobile computing device, instructions to the another computing device to adjust the plurality of displays.

Example 31 includes the subject matter of any of Examples 18-30, and wherein adjusting the plurality of displays comprises adjusting the plurality of displays in response to retrieving configuration data indicative of the determined configuration for each display from a cloud server.

Example 32 includes the subject matter of any of Examples 18-31, and wherein determining the configuration for each display comprises determining a proper orientation and resolution for each display.

Example 33 includes the subject matter of any of Examples 18-32, and wherein the setup image includes a depth channel.

Example 34 includes the subject matter of any of Examples 18-33, and wherein determining the configuration for each display comprises determining the configuration based on a setup recommendation received from a cloud server, wherein the setup recommendation is based on display configurations utilized by a plurality of other users.

Example 35 includes a computing device comprising a processor; and a memory having stored therein a plurality of instructions that when executed by the processor cause the computing device to perform the method of any of Examples 18-34.

Example 36 includes one or more machine-readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a mobile computing device for display calibration, the mobile computing device comprising means for pairing the mobile computing device with another computing device communicatively coupled to a plurality of displays; means for capturing, by a camera of the mobile computing device, a setup image of the plurality of displays; means for determining a physical relationship among the displays captured in the setup image; means for determining a context of the mobile computing device; and means for determining a configuration for each display of the plurality of displays based on the determined physical relationship among the displays captured in the setup image and the determined context of the mobile computing device.

Example 39 includes the subject matter of Example 38, and wherein the means for determining the configuration for each display comprises means for determining a proper alignment of each display.

Example 40 includes the subject matter of any of Examples 38 and 39, and further including means for identifying each display of the plurality of displays captured in the setup image.

Example 41 includes the subject matter of any of Examples 38-40, and wherein the means for determining the configuration for each display comprises means for determining the configuration based on an identification of the corresponding display.

Example 42 includes the subject matter of any of Examples 38-41, and wherein the identification of the corresponding display comprises an Extended Display Identification Data (EDID) identifier.

Example 43 includes the subject matter of any of Examples 38-42, and wherein the means for identifying each display of the plurality of displays comprises means for identifying each display based on an identifier rendered on the corresponding display and captured in the setup image.

Example 44 includes the subject matter of any of Examples 38-43, and wherein the means for determining the context of the mobile computing device comprises means for determining a location of the mobile computing device.

Example 45 includes the subject matter of any of Examples 38-44, and wherein the means for determining the context of the mobile computing device comprises means for determining a current user of the mobile computing device.

Example 46 includes the subject matter of any of Examples 38-45, and further including means for storing configuration data indicative of the determined configuration for each display.

Example 47 includes the subject matter of any of Examples 38-46, and wherein the means for storing the configuration data comprises means for generating a hash associated with the display setup based on the determined context.

Example 48 includes the subject matter of any of Examples 38-47, and wherein the means for storing the configuration data comprises means for transmitting the configuration data to a cloud server.

Example 49 includes the subject matter of any of Examples 38-48, and further including means for adjusting the plurality of displays based on the configuration for each display.

Example 50 includes the subject matter of any of Examples 38-49, and wherein the means for adjusting the plurality of displays comprises means for transmitting instructions to the another computing device to adjust the plurality of displays.

Example 51 includes the subject matter of any of Examples 38-50, and wherein the means for adjusting the plurality of displays comprises means for adjusting the plurality of displays in response to retrieving configuration data indicative of the determined configuration for each display from a cloud server.

Example 52 includes the subject matter of any of Examples 38-51, and wherein the means for determining the configuration for each display comprises means for determining a proper orientation and resolution for each display.

Example 53 includes the subject matter of any of Examples 38-52, and wherein the setup image includes a depth channel.

Example 54 includes the subject matter of any of Examples 38-53, and wherein the means for determining the configuration for each display comprises means for determining the configuration based on a setup recommendation received from a cloud server, wherein the setup recommendation is based on display configurations utilized by a plurality of other users.

The invention claimed is:

1. A mobile computing device for display calibration, the mobile computing device comprising:
a camera;
a communication circuitry to pair the mobile computing device with another computing device communicatively coupled to a plurality of displays;
an imaging capturing circuitry to capture a setup image of a display setup of the plurality of displays with the camera;
an image analysis circuitry to determine a physical relationship among the displays captured in the setup image, wherein the physical relationship identifies a spatial relationship between the displays indicative of alignment and orientation of the displays based on a three-dimensional position of each display relative to one another as depicted in the setup image;
an image analysis circuitry to determine a physical relationship among the displays captured in the setup image, wherein the physical relationship identifies a spatial relationship between the displays captured in the setup image as depicted in the setup image;
a context determination circuitry to determine a context of the mobile computing device; and
display configuration circuitry to determine a configuration for each display of the plurality of displays based on the determined physical relationship among the displays captured in the setup image and the determined context of the mobile computing device.

2. The mobile computing device of claim 1, wherein to determine the configuration for each display comprises to determine a proper alignment of each display.

3. The mobile computing device of claim 1, wherein the display configuration circuitry is further to identify each display of the plurality of displays captured in the setup image.

4. The mobile computing device of claim 3, wherein to determine the configuration for each display comprises to determine the configuration based on an identification of the corresponding display.

5. The mobile computing device of claim 4, wherein the identification of the corresponding display comprises an Extended Display Identification Data (EDID) identifier.

6. The mobile computing device of claim 3, wherein to identify each display of the plurality of displays comprises to identify each display based on an identifier rendered on the corresponding display and captured in the setup image.

7. The mobile computing device of claim 1, wherein to determine the context of the mobile computing device comprises to determine at least one of a location or a current user of the mobile computing device.

8. The mobile computing device of claim 1, wherein the display configuration circuitry is further to store configuration data indicative of the determined configuration for each display.

9. The mobile computing device of claim 8, wherein to store the configuration data comprises to generate a hash associated with the display setup based on the determined context.

10. The mobile computing device of claim 1, wherein the display configuration circuitry is further to adjust the plurality of displays based on the configuration for each display.

11. The mobile computing device of claim 10, wherein to adjust the plurality of displays comprises to transmit instructions to the another computing device to adjust the plurality of displays.

12. The mobile computing device of claim 11, wherein to adjust the plurality of displays comprises to adjust the plurality of displays in response to retrieval of configuration data indicative of the determined configuration for each display from a cloud server.

13. The mobile computing device of claim 1, wherein to determine the configuration for each display comprises to determine a proper orientation and resolution for each display.

14. The mobile computing device of claim 1, wherein the setup image includes a depth channel.

15. The mobile computing device of claim 1, wherein to determine the configuration for each display comprises to determine the configuration based on a setup recommendation received from a cloud server, wherein the setup recommendation is based on display configurations utilized by a plurality of other users.

16. One or more machine-readable storage media comprising a plurality of instructions stored thereon that, in response to execution by a mobile computing device, cause the mobile computing device to:
   pair the mobile computing device with another computing device communicatively coupled to a plurality of displays;
   capture, by a camera of the mobile computing device, a setup image of the plurality of displays;
   determine a physical relationship among the displays captured in the setup image, wherein the physical relationship identifies a spatial relationship between the displays indicative of alignment and orientation of the displays based on a three-dimensional position of each display relative to one another as depicted in the setup image;
   determine a context of the mobile computing device; and
   determine a configuration for each display of the plurality of displays based on the determined physical relationship among the displays captured in the setup image and the determined context of the mobile computing device.

17. The one or more machine-readable storage media of claim 16, wherein to determine the configuration for each display comprises to determine a proper alignment of each display.

18. The one or more machine-readable storage media of claim 16, wherein the plurality of instructions further cause the mobile computing device to identify each display of the plurality of displays captured in the setup image.

19. The one or more machine-readable storage media of claim 18, wherein to determine the configuration for each display comprises to determine the configuration based on an identification of the corresponding display.

20. The one or more machine-readable storage media of claim 19, wherein the identification of the corresponding display comprises an Extended Display Identification Data (EDID) identifier.

21. A method for display calibration by a mobile computing device, the method comprising:
   pairing the mobile computing device with another computing device communicatively coupled to a plurality of displays;
   capturing, by a camera of the mobile computing device, a setup image of the plurality of displays;
   determining, by the mobile computing device, a physical relationship among the displays captured in the setup image, wherein the physical relationship identifies a spatial relationship between the displays indicative of alignment and orientation of the displays based on a three-dimensional position of each display relative to one another as depicted in the setup image
   determining, by the mobile computing device, a context of the mobile computing device; and
   determining, by the mobile computing device, a configuration for each display of the plurality of displays based on the determined physical relationship among the displays captured in the setup image and the determined context of the mobile computing device.

22. The method of claim 21, further comprising identifying each display of the plurality of displays captured in the setup image based on an identifier rendered on the corresponding display and captured in the setup image.

23. The method of claim 21, further comprising adjusting the plurality of displays based on the configuration for each display.

24. The method of claim 23, wherein adjusting the plurality of displays comprises transmitting, from the mobile computing device, instructions to the another computing device to adjust the plurality of displays.

25. The method of claim 21, wherein determining the configuration for each display comprises determining a proper orientation and resolution for each display.

* * * * *